United States Patent [19]
Hopkins et al.

[11] Patent Number: 5,490,190
[45] Date of Patent: Feb. 6, 1996

[54] ALIGNMENT PIN AND METHOD FOR ALIGNING A NUCLEAR FUEL ASSEMBLY WITH RESPECT TO A CORE PLATE DISPOSED IN A NUCLEAR REACTOR PRESSURE VESSEL

[75] Inventors: Ronald J. Hopkins; John T. Land, both of Pensacola, Fla.

[73] Assignee: Westinghouse Electric Corporation, Pittsburgh, Pa.

[21] Appl. No.: 360,514

[22] Filed: Dec. 21, 1994

[51] Int. Cl.⁶ .................................................. G21C 5/06
[52] U.S. Cl. ..................... 376/364; 411/109; 411/263; 411/307
[58] Field of Search ...................... 376/364, 362, 376/446; 411/263, 307, 383, 413, 109

[56] References Cited

U.S. PATENT DOCUMENTS

| | | | |
|---|---|---|---|
| 4,690,600 | 9/1987 | Lauer | 376/364 |
| 4,820,479 | 4/1989 | Hornak et al. | 376/364 |
| 5,030,413 | 7/1991 | Knierriem et al. | 376/364 |
| 5,164,154 | 11/1992 | Brown et al. | 376/364 |
| 5,297,176 | 3/1994 | Altman et al. | 376/364 |

*Primary Examiner*—Daniel D. Wasil
*Attorney, Agent, or Firm*—Walter S. Stevens

[57] ABSTRACT

Self-locking alignment pin and method for aligning a nuclear fuel assembly with respect to a core plate disposed in a nuclear reactor pressure vessel. The fuel assembly has a top nozzle having a first bore formed therein. The core plate has a second bore alignable with the first bore. The second bore has first threads of a first predetermined pitch and second threads of a second predetermined pitch. The alignment pin further includes a shaft that has an end portion having third threads of the first predetermined pitch for threadably engaging the first threads of the second bore. A flange, which has a plurality of recesses in the underside surface thereof, surrounds the shaft and is integrally attached thereto. A locking member surrounds the flange and has exterior fourth threads of the predetermined second pitch for threadably engaging the second threads of the second bore. The locking member also has deformable portions adapted to engage respective ones of the recesses for locking the locking member to the flange. The flange and the shaft are prevented from disengaging the bore in the core plate because the first and third threads have a pitch different than the pitch of the second and fourth threads.

9 Claims, 5 Drawing Sheets

ALIGNMENT PIN AND METHOD FOR ALIGNING A NUCLEAR FUEL ASSEMBLY WITH RESPECT TO A CORE PLATE DISPOSED IN A NUCLEAR REACTOR PRESSURE VESSEL

BACKGROUND OF THE INVENTION

This invention generally relates to alignment devices and methods and more particularly relates to a self-locking alignment pin and method for aligning a nuclear fuel assembly with respect to a core plate disposed in a nuclear reactor pressure vessel, the alignment pin being connectable to the core plate exclusively from below the core plate.

Nuclear reactor vessel control rods are controllably lowered vertically through the upper core plate into the thimble tubes of the fuel assemblies and also raised vertically out of the thimble tubes through the upper core plate. Therefore, it is important that the fuel assemblies be accurately aligned relative to the upper core plate in order to allow accurate and free passage of the control rods into and out of the fuel assembly thimble tubes.

To reference the fuel assembly to the upper core plate, the core plate typically has protruding alignment pins oriented parallel to the axes of the fuel rods, control rods and thimble tubes. The alignment pins connected to and protruding downwardly from the upper core plate mate with openings in the top nozzle of the fuel assembly, thereby fixing the positions of the fuel assembly thimble tubes and control rods relative to the upper core plate.

However, the alignment pins are sometimes damaged (e.g., bent) during fuel assembly servicing. Although slightly bent alignment pins can be satisfactorily straightened, some alignment pins may be bent severe enough to cause their replacement. Bent alignment pins are undesirable because bent alignment pins can adversely affect the ability to control the reactor core, due to the resulting misalignment of the control rods and the thimble tubes for receiving the control rods. Therefore, in order to avoid the risk of such misalignment, the alignment pins are routinely checked, and replaced if necessary.

A certain amount of space is needed to accommodate the tools and video cameras needed to conduct pin replacement operations. In this regard, part of the upper internals of the reactor, in the region above the upper core plate, is removed to gain access to clamping nuts of the alignment pins, which clamping nuts are only accessible from above the upper core plate. However, removal and replacement of parts of the upper internals is time consuming and may cause damage to such structures. Therefore, it is desirable to provide an alignment pin replacement technique which is conducted entirely from below the upper core plate thereby obviating the need to remove and replace the upper internals.

Moreover, prior art alignment pins engage the core plate by an interference fit with a bore formed in the core plate to assist locking the alignment pin to the core plate. That is, the alignment pin has a diameter slightly larger (e.g., 0.001 inch) than the bore in the core plate that receives the alignment pin. Therefore, after the clamping nuts are removed, such an alignment pin must be drilled out of the hole from beneath the core plate and the hole is re-sized in order to receive a replacement alignment pin. However, it would be preferable if replacement of the alignment pin were not to require the time-consuming process of drilling-out the alignment pin and resizing the bore.

However, alignment pins for aligning a nuclear fuel assembly to an upper core plate of a nuclear reactor and that are replaceable entirely from below the core plate are known. A guide pin aligning a top nozzle of a nuclear fuel assembly to an upper core plate of a nuclear reactor and that is replaced exclusively from below the upper core plate is disclosed in U.S. Pat. No. 5,297,176 titled "Remotely Replaceable Fuel Assembly Alignment Pin" issued Mar. 22, 1994 in the name of David A. Altman, et al. and assigned to the assignee of the present invention. Although the Altman, et al. patent discloses a guide pin for aligning a top nozzle of a nuclear fuel assembly to an upper core plate and is replaceable by working entirely from below the upper core plate, this patent does not disclose an alignment pin obviating the time-consuming need to drill-out the alignment pin.

Therefore, what is needed is a self-locking alignment pin and method for aligning a nuclear fuel assembly with respect to a core plate disposed in a nuclear reactor pressure vessel, the alignment pin being connectable to the core plate exclusively from below the core plate.

SUMMARY OF THE INVENTION

The invention in its broad form is, for use in a reactor vessel belonging to a nuclear steam supply system, a self-locking alignment pin for aligning a nuclear fuel assembly with respect to a core plate, the core plate having first threads of a first predetermined pitch and second threads of a second predetermined pitch, comprising a shaft capable of being connected to the fuel assembly, said shaft having third threads of the first predetermined pitch for threadably engaging the first threads; and a locking member capable of being connected to said shaft, said locking member having fourth threads of the second predetermined pitch for threadably engaging the second threads, whereby said shaft interconnects the fuel assembly to the core plate as the third threads engage the first threads and as the fourth threads engage the second threads and whereby the fuel assembly is aligned with respect to the core plate as the shaft interconnects the fuel assembly to the core plate.

The invention in its broad form is also, in a reactor vessel belonging to a nuclear steam supply system, a method of aligning a fuel assembly with respect to a core plate disposed above the fuel assembly by means of a self-locking alignment pin, the fuel assembly having a first bore formed therein, the core plate having a second bore formed therein having first threads of a first predetermined pitch and second threads of a second predetermined pitch, the method comprising the steps of providing a plug capable of slidably engaging the first bore; providing a shaft having a first end portion integrally attached to the plug and a second end portion having third threads of the first predetermined pitch, the shaft having an integrally attached flange theresurrounding having an underside surface having a recess therein; locking an annular bowl-shaped sleeve to the flange by surrounding the flange with the sleeve and engaging a deformable portion of the sleeve with the recess in the underside surface of the flange, the sleeve having fourth threads of the second predetermined pitch circumscribing the exterior of the sleeve; and aligning the fuel assembly with respect to the core plate, including the steps of slidably engaging the plug with the first bore formed in the fuel assembly; connecting the shaft to the core plate by threadably engaging the third threads of the shaft with the first threads of the second bore; and connecting the sleeve to the bore by engaging the fourth threads of the sleeve with the second threads of the second bore.

An object of the present invention is to provide a self-locking feature not requiring the use of an interference fit to lock or connect the alignment pin to the core plate.

A feature of the present invention is the provision of a bowl-shaped locking member for locking the alignment pin to the core plate.

An advantage of the present invention is that the self-locking alignment pin obviates the time-consuming need to drill-out the alignment pin and resize the hole in which it is disposed in the core plate in order to replace the alignment pin.

Another advantage of the present invention is that the alignment pin of the invention obviates the time-consuming need to remove and replace the upper reactor internals because the alignment pin is connectable and replaceable exclusively from below the upper core plate.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following description taken in conjunction with the accompanying drawings wherein:

DETAILED DESCRIPTION OF THE PREFERRED EMBODIMENT

Figure 1:
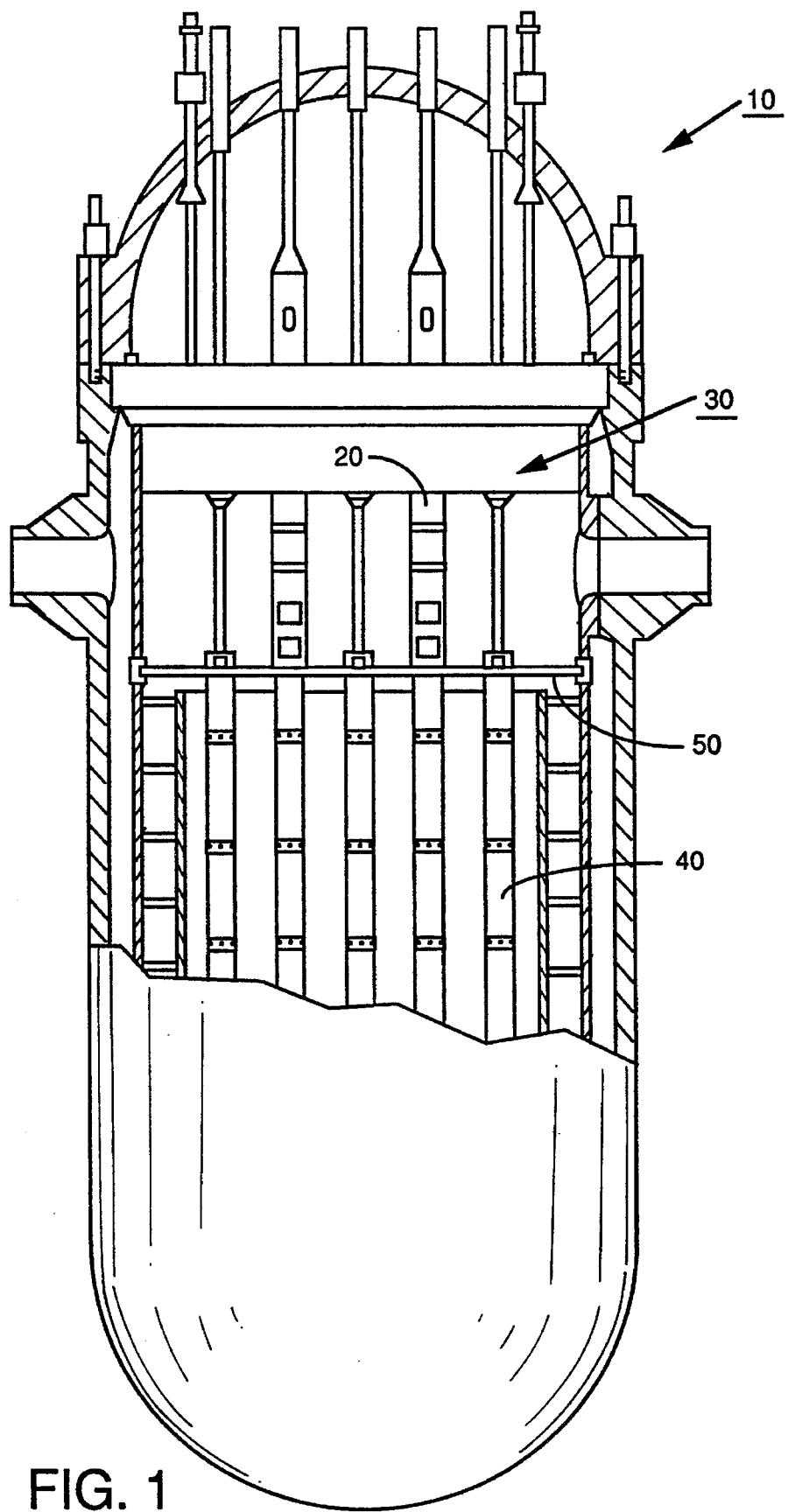
FIG. 1 is a view in partial vertical section of a nuclear reactor pressure vessel with parts removed for clarity.
Figure 2:
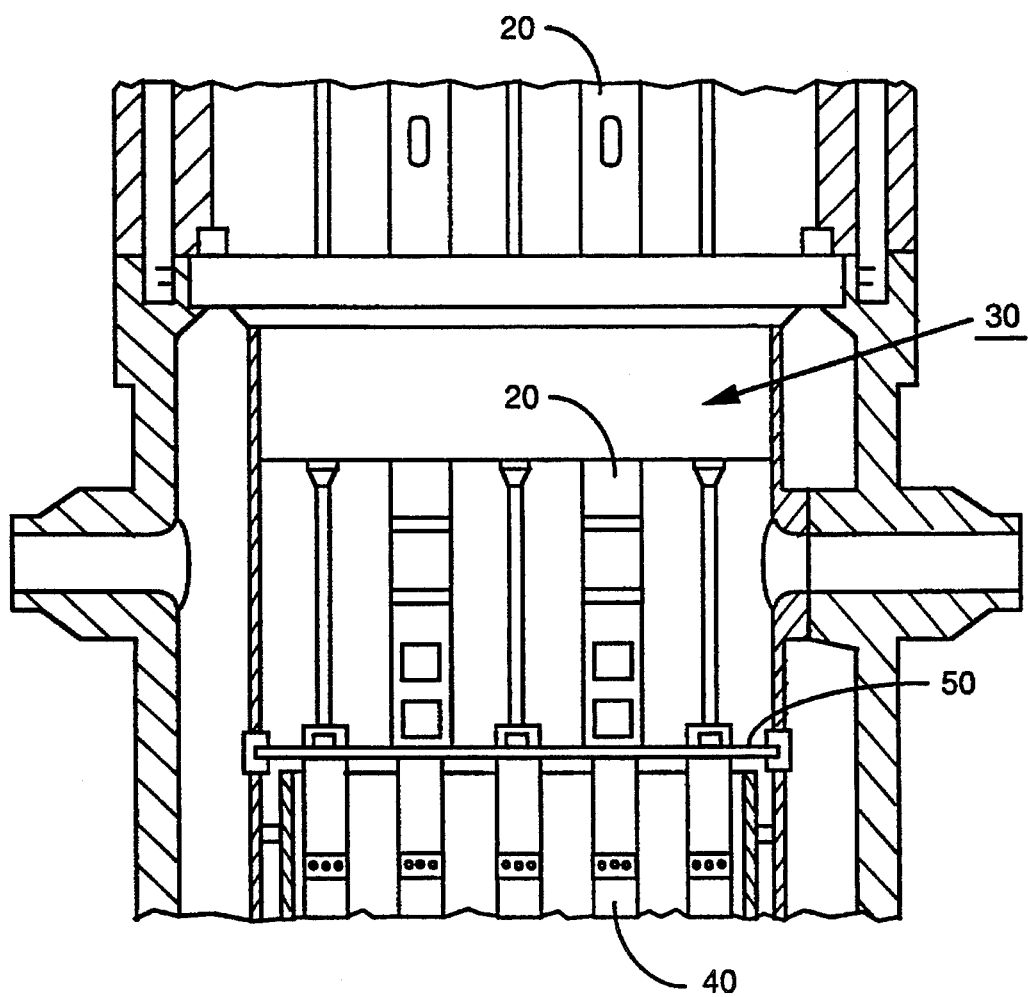
FIG. 2 is a view in partial vertical section of the nuclear reactor pressure vessel showing control rod guide tubes, an upper core plate and fuel assemblies all aligned in operative relationship.
Figure 3:
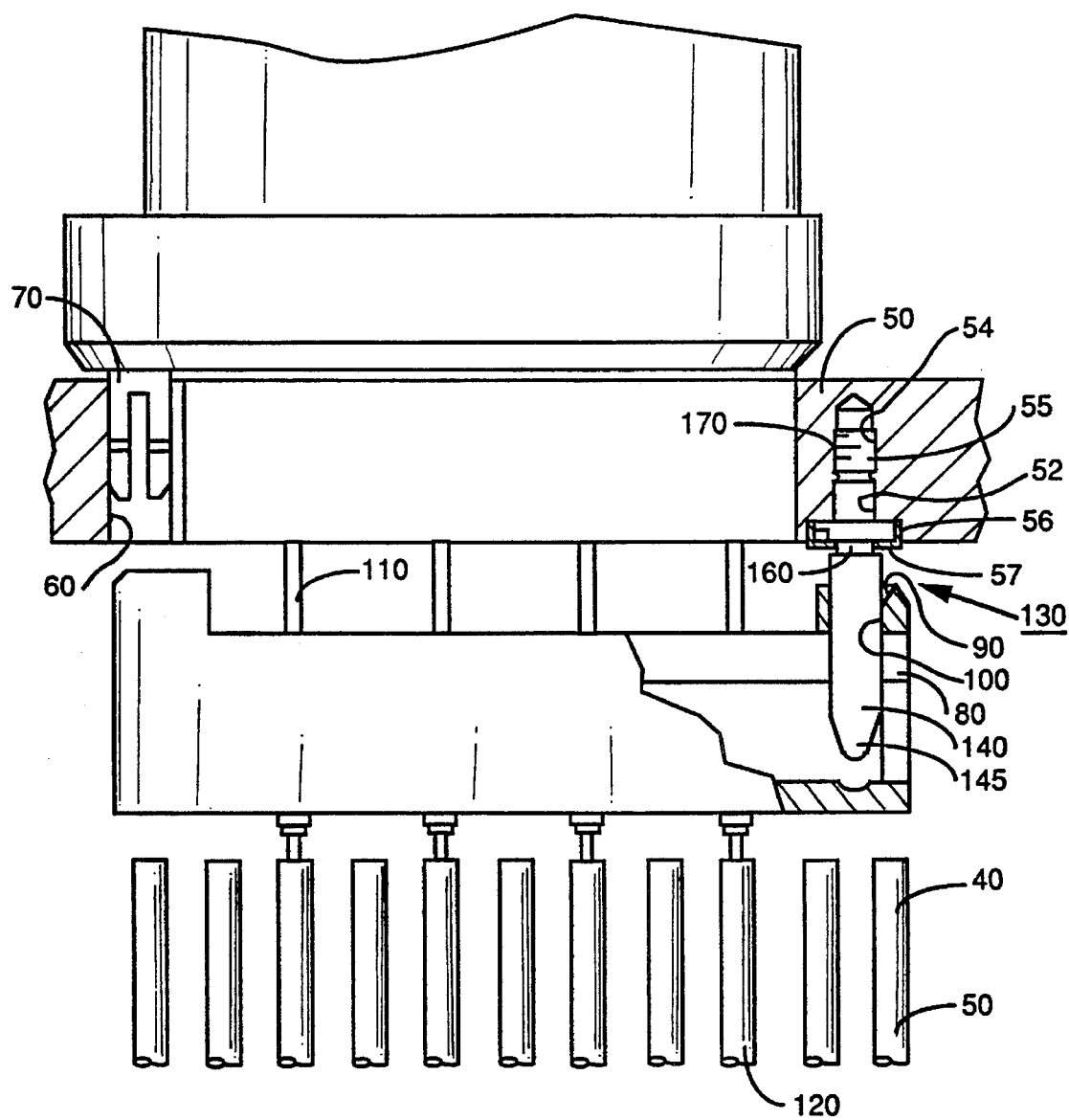
FIG. 3 is a view in partial vertical section of one of the fuel assemblies aligned with respect to the upper core plate by means of an alignment pin belonging to the invention.
Figure 4:
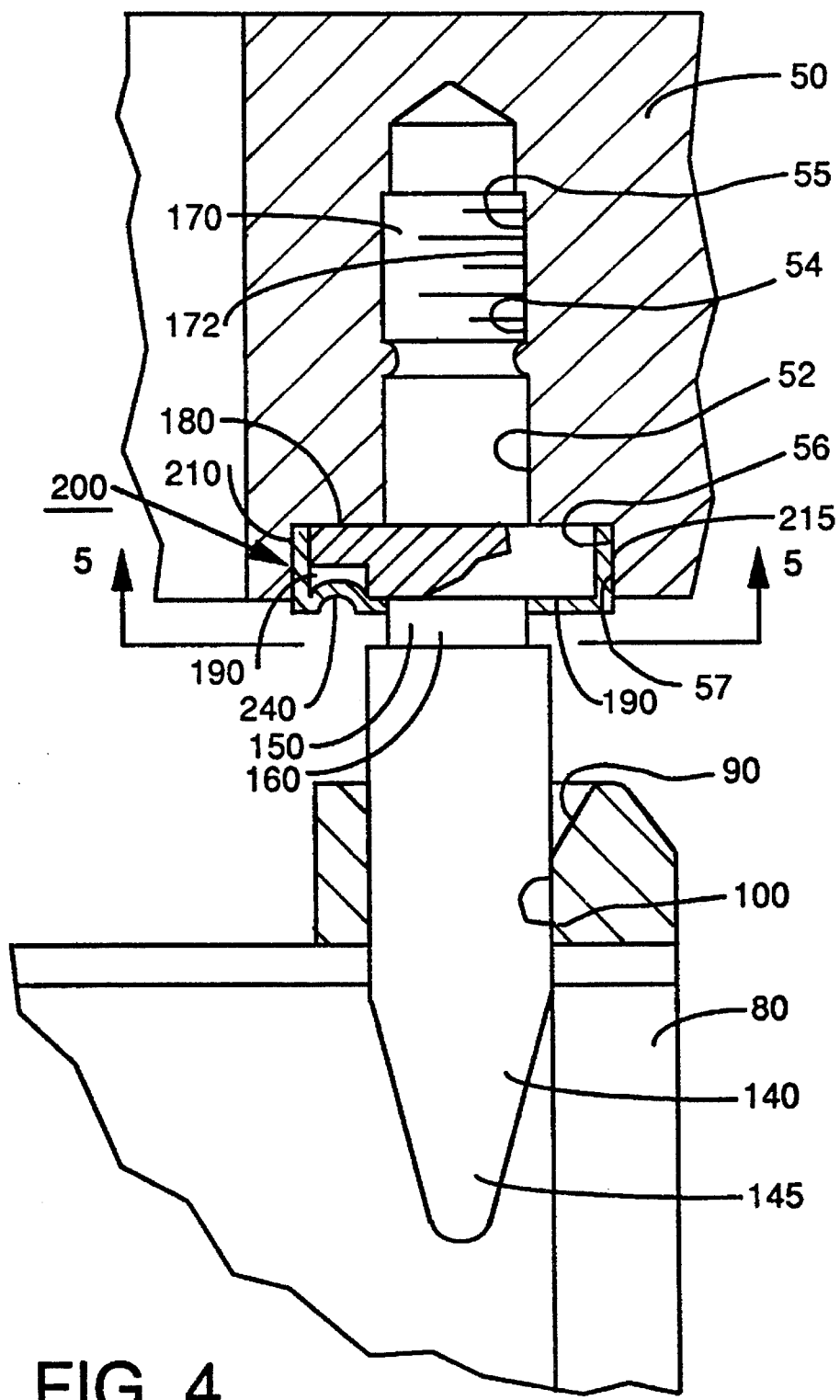
FIG. 4 is a view in partial vertical section of the alignment pin aligning a top nozzle of the fuel assembly with the upper core plate.
Figure 5:
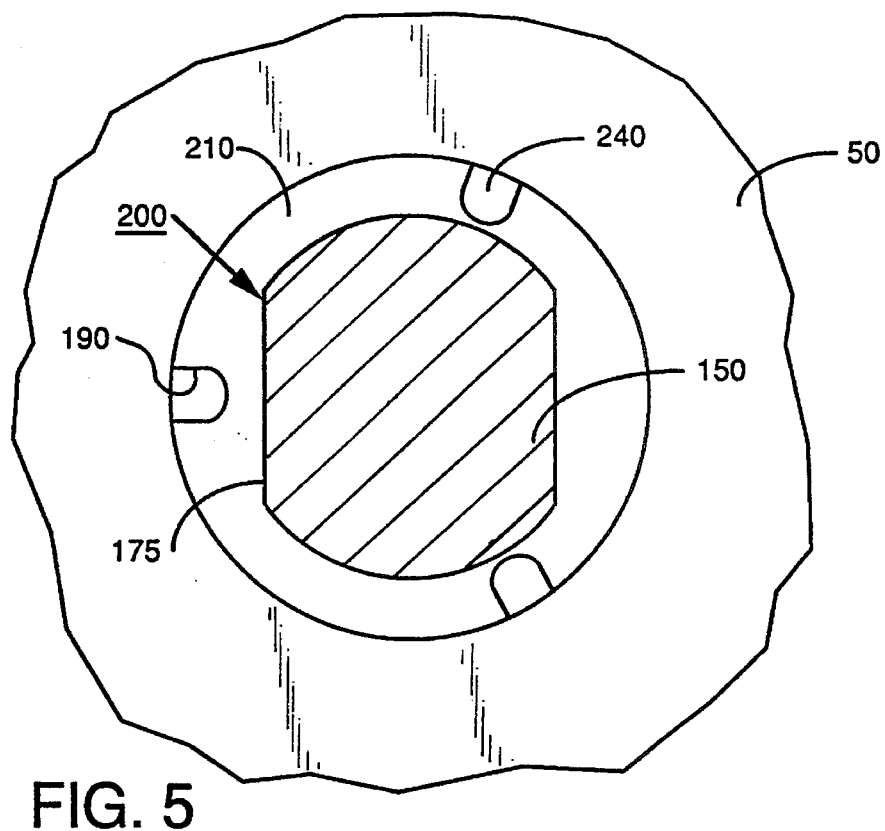
FIG. 5 is a view taken along section line 5—5 of FIG. 4.
Figure 6:
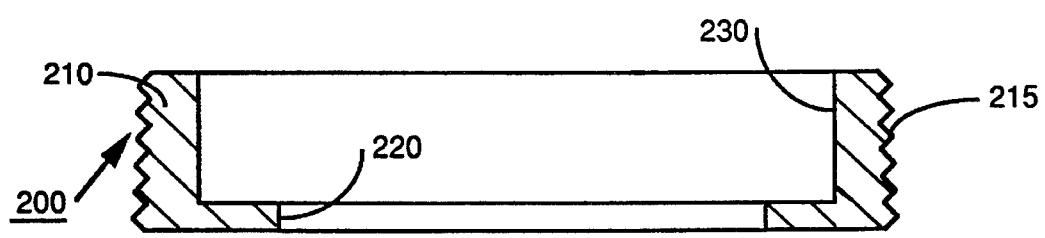
FIG. 6 is a view in vertical section of a locking member belonging to the invention.

Referring to FIGS. 1, 2 and 3, there is shown a nuclear reactor pressure vessel, generally referred to as 10, for producing heat by the controlled fission of nuclear fuel contained therein. Disposed in pressure vessel 10 are a plurality of control rod guide tubes 20, an upper internals structure, generally referred to as 30, and a plurality of nuclear fuel assemblies 40, the fuel assemblies 40 being disposed below an upper core plate 50. Each fuel assembly 40 includes a plurality of fuel rods 45 containing the previously mentioned nuclear fuel. For reasons disclosed more fully hereinbelow, upper core plate 50 has a step bore or counter bore 52 formed therein, the bore 52 having a distal portion 54 of a predetermined first diameter and a proximal portion 56 of a predetermined second diameter larger than the first diameter. Distal portion 54 has first threads 55 of a first predetermined pitch and proximal portion 56 has second threads 57 of a second predetermined pitch, for reasons provided hereinbelow. Of course, it will be appreciated from the several figures, that the terminology "distal portion" means that portion further away from fuel rods 45 and the terminology "proximal portion" means that portion nearer to fuel rods 45.

As best seen in FIG. 3, guide tube 20 is referenced to upper core plate 50 by a through-hole 60 formed through upper core plate 50, the through-hole 60 receiving a guide tube support pin 70 that is attached to guide tube 20. Moreover, each fuel assembly 40 includes a top nozzle 80 having tapered openings 90 leading to cylindrical bores 100 formed in top nozzle 80. Top nozzle 80 is centrally open to allow passage of a plurality of control rods 110 into respective ones of a plurality of control rod thimble tubes 120 which are interspersed among fuel rods 45. Top nozzle 80 forms an enclosure allowing control rods 110 to pass from guide tube 20, through an opening (not shown) in upper core plate 50, through the central opening (not shown) in top nozzle 80 and into thimble tubes 120. Thimble tubes 120 extend to a bottom nozzle (not shown), such that each fuel assembly 40 forms a unitary structure upon which fuel rods 45 can be moved about as a unit for servicing (e.g., during refueling).

Referring to FIGS. 3, 4, 5 and 6, there is shown the subject matter of the present invention, which is a self-locking alignment pin, generally referred to as 130, for aligning a first structure, such as fuel assembly 40, with respect to a second structure, such as upper core plate 50. As disclosed in more detail hereinbelow, alignment pin 130 is connectable to and replaceable exclusively or entirely from below upper core plate 50. It is important that alignment pin 130 be connectable to and replaceable exclusively from below upper core plate 50. This is important in order to avoid the problems associated with some prior art alignment pins; that is, to obviate the need to remove and replace upper internal structure 30 and the need to drill-out the alignment pin and resize the bore in the core plate in order to connect or replace the alignment pin.

Still referring to FIGS. 3, 4, 5 and 6, alignment pin 130 comprises a plug 140 having a tapered or cone-shaped nose portion 145 in a configuration complementary to opening 90, so that plug 140 is capable of slidably engaging opening 90 and bore 100. In this manner, plug 140 is engaged to top nozzle 80 of fuel assembly 40. An elongate shaft 150 has a proximal end portion 160 integrally attached to plug 140. Shaft 150 also has a distal end portion 170 having third threads 172 threadably engaging distal portion 54 of bore 52 for threadably connecting shaft 150 to upper core plate 50. The third threads 172 belonging to shaft 150 have the same pitch as the first threads of distal portion 54 of bore 52. Moreover, shaft 150 may have flat side portions 175 that allow engagement by a socket wrench (not shown) for rotating shaft 150 into threaded engagement with distal portion 54 of bore 52. Surrounding shaft 150 and integrally connected thereto is a flange 180 having a plurality of spaced-apart depressions or recesses 190 formed in an underside surface 195 of flange 180 for reasons disclosed hereinbelow.

Referring to FIGS. 3, 4, 5 and 6, a locking member, generally referred to as 200, comprises an annular cup-shaped sleeve 210 having fourth threads 215 surrounding the external circumference thereof for threadably engaging the second threads 57 belonging to proximal portion 56 of bore 52. Of course cup-shaped sleeve 210 has a suitably sized hole 220 through the bottom thereof for receiving shaft 150. Moreover, cup-shaped sleeve 210 defines a cavity 230 therein sized to matingly surround the periphery of flange 180 as it threadably engages distal portion 56 of bore 52. Sleeve 210 is made from a deformable material, so that portions 240 of sleeve 210 can be deformed or crimped to engage respective ones of recesses 190 formed in the underside surface of flange 180. In this manner, sleeve 210 can be locked to flange 180 and thus to shaft 150.

It will be appreciated from the description hereinabove that an advantage of the present invention is that alignment pin 130 is self-locking, thereby obviating the time-consuming need to drill-out the alignment pin and resize the hole in which it is disposed in the core plate in order to replace the alignment pin. More specifically, alignment pin 130 is self-locking in the sense that shaft 150 is prevented from threadably disengaging distal portion 54 of bore 52 and flange 180 is prevented from threadably disengaging proximal portion 56 of bore 52 because threads 55/172 have a predetermined pitch different than the predetermined pitch of threads 57/215 and because flange 180, which is integrally attached to shaft 150, is affixed in sleeve 210 by means of deformable portions 240 engaging recesses 190.

It will be further appreciated from the description hereinabove that another advantage of the present invention is that alignment pin 130 obviates the time-consuming need to remove and replace the upper reactor internals because alignment pin 130 is connectable and replaceable exclusively from below the upper core plate.

Although the invention is illustrated and described herein in its preferred embodiment, it is not intended that the invention as illustrated and described be limited to the details shown, because various modifications may be obtained with respect to the invention without departing from the spirit of the invention or the scope of equivalents thereof. For example, although the invention is disclosed herein for aligning a first structure (e.g., fuel assembly) with respect to a second structure (e.g., upper core plate) disposed in a vessel (e.g., nuclear reactor pressure vessel) belonging to a nuclear steam supply system, the invention is also usable for aligning a first structure with respect to a second structure whether or not the structures are disposed in a vessel belonging to a nuclear steam supply system.

Therefore, what is provided are a self-locking alignment pin and method for aligning a nuclear fuel assembly with respect to a core plate disposed in a nuclear reactor pressure vessel, the alignment pin being connectable to the core plate exclusively from below the core plate.

What is claimed is:

1. For use in a reactor vessel belonging to a nuclear steam supply system, a self-locking alignment pin for aligning a nuclear fuel assembly with respect to a core plate, the core plate having first threads of a first predetermined pitch and second threads of a second predetermined pitch, said first predetermined pitch being different than said second predetermined pitch, comprising:

(a) a shaft capable of being connected to the fuel assembly, said shaft having third threads of the first predetermined pitch for threadably engaging the first threads; and (b) a locking member capable of being connected to said shaft, said locking member having fourth threads of the second predetermined pitch for threadably engaging the second threads, whereby said shaft interconnects the fuel assembly to the core plate as the third threads engage the first threads and as the fourth threads engage the second threads and whereby the fuel assembly is aligned with respect to the core plate as the shaft interconnects the fuel assembly to the core plate.

2. The alignment pin of claim 1, (a) wherein said shaft has a recess therein; and (b) wherein said locking member has a deformable portion thereof adapted to engage the recess for locking said locking member to said shaft.

3. For use in a reactor vessel belonging to a nuclear steam supply system, a self-locking alignment pin for aligning a fuel assembly with respect to a core plate disposed above the fuel assembly, the fuel assembly having a first bore formed therein, the core plate having a second bore formed therein having first threads of a first predetermined pitch and second threads of a second predetermined pitch, the alignment pin comprising:

(a) a plug capable of slidably engaging the first bore formed in the fuel assembly for connecting said plug to the fuel assembly;

(b) a shaft having a first end portion integrally attached to said plug and a second end portion having third threads of the first predetermined pitch for threadably engaging the first threads of the second bore to threadably connect said shaft to the core plate;

(c) a flange surrounding said shaft and integrally attached thereto, said flange having an underside surface having a recess therein; and (d) a locking member surrounding said flange and having fourth threads of the predetermined second pitch for threadably engaging the second threads, said locking member having a deformable portion thereof adapted to engage the recess for locking said locking member to said flange, whereby said shaft is connected to the core plate as the first threads of the first predetermined pitch engage the third threads and as the second threads of the second predetermined pitch engage the fourth threads and as the deformable portion of said locking member is deformed to engage the recess, and whereby the fuel assembly is aligned with respect to the core plate as said plug is connected to the fuel assembly and as said shaft is connected to the core plate.

4. The alignment pin of claim 3, wherein said locking member is an annular bowl-shaped sleeve having a flanged portion thereof having a deformable portion overlapping the recess and deformable into engagement with the recess.

5. The alignment pin of claim 3, wherein said plug has a cone-shaped portion for slidably engaging the first bore formed in the fuel assembly.

6. The alignment pin of claim 3, wherein said shaft is connectable to the core plate exclusively from below the core plate.

7. The alignment pin of claim 3, (a) wherein said flange has a plurality of recesses therein; and (b) wherein said locking member has a plurality of deformable portions thereof adapted to overlap and engage respective ones of the recesses.

8. In a reactor vessel belonging to a nuclear steam supply system, a method of aligning a fuel assembly with respect to a core plate disposed above the fuel assembly by means of a self-locking alignment pin, the fuel assembly having a first bore formed therein, the core plate having a second bore formed therein having first threads of a first predetermined pitch and second threads of a second predetermined pitch, the method comprising the steps of:

(a) providing a plug capable of slidably engaging the first bore;

(b) providing a shaft having a first end portion integrally attached to the plug and a second end portion having third threads of the first predetermined pitch, the shaft having an integrally attached flange theresurrounding having an underside surface having a recess therein;

(c) locking an annular bowl-shaped sleeve to the flange by surrounding the flange with the sleeve and engaging a deformable portion of the sleeve with the recess in the underside surface of the flange, the sleeve having fourth threads of the second predetermined pitch circumscribing the exterior of the sleeve; and (d) aligning the fuel assembly with respect to the core plate, including the steps of:

(i) slidably engaging the plug with the first bore formed in the fuel assembly;

(ii) connecting the shaft to the core plate by threadably engaging the third threads of the shaft with the first threads of the second bore; and (iii) connecting the sleeve to the bore by engaging the fourth threads of the sleeve with the second threads of the second bore.

9. The method of claim 8, wherein said step of aligning the fuel assembly with respect to the core plate comprises the step of aligning the fuel assembly with respect to the core plate exclusively from below the core plate.

* * * * *